United States Patent [19]

Imai

[11] Patent Number: 5,388,526

[45] Date of Patent: Feb. 14, 1995

[54] CONVEYER SYSTEM HAVING FLEXIBLE MAGNETIC INNER SLIDER FOR PROPELLING OUTER MEMBER

[75] Inventor: Kazuhisa Imai, Ojima, Japan

[73] Assignee: I. Tech Inc., Ohta, Japan

[21] Appl. No.: 46,652

[22] Filed: Apr. 13, 1993

[30] Foreign Application Priority Data

Apr. 15, 1992 [JP] Japan .................................. 4-140887
Apr. 15, 1992 [JP] Japan .................................. 4-140888
Apr. 15, 1992 [JP] Japan .................................. 4-140889

[51] Int. Cl.⁶ .............................................. B61B 13/10
[52] U.S. Cl. ................................. 104/138.1; 104/290; 104/118; 198/619; 285/371; 285/397
[58] Field of Search ................. 104/138.1, 138.2, 290, 104/118; 105/141; 198/619, 805; 285/370, 371, 397, 414

[56] References Cited

U.S. PATENT DOCUMENTS

| 2,944,842 | 7/1960 | Stiff | 285/371 X |
| 3,749,025 | 7/1973 | Giraud | 104/290 X |
| 3,882,791 | 5/1975 | Youngscap | 198/619 X |
| 4,457,423 | 7/1984 | Stoll | 198/619 |
| 5,131,330 | 7/1992 | Sone | 104/138.1 |
| 5,241,912 | 9/1993 | Oshima et al. | 104/138.1 X |

FOREIGN PATENT DOCUMENTS

| 0422261 | 4/1991 | European Pat. Off. | |
| 2484970 | 12/1981 | France | |
| 2737924 | 3/1979 | Germany | |
| 7915962 | 6/1981 | Germany | |
| 3236947 | 4/1985 | Germany | 104/138.2 |
| 4873979 | 10/1973 | Japan | |
| 6411534 | 2/1989 | Japan | |
| 2309087 | 12/1990 | Japan | 285/397 |
| 28875 | 1/1903 | Switzerland | 285/370 |
| 289040 | 12/1970 | U.S.S.R. | 104/138.1 |

OTHER PUBLICATIONS

Patent Abstracts of Japan dated Jun. 30, 1989, vol. 013287 for Japanese Patent Publication JP1081718.

Primary Examiner—Robert J. Oberleitner
Assistant Examiner—S. Joseph Morano
Attorney, Agent, or Firm—Bachman & LaPointe

[57] ABSTRACT

In a conveyer system including a tubular guide way having a curved guide way section, a magnet-mounted inner slider slidably disposed in the tubular guide way, a pressure source connected to the tubular guide way to feed the interior thereof with a pressurized air thereby to move the inner slider in and along the tubular guide way, and a magnet-mounted outer slider movably disposed on said tubular guide way. The magnet of the outer slider establishes a magnetic connection with the magnet of the inner slider so that movement of said inner slider can induce movement of the outer slider in the same direction. In order to smooth the movement of the inner slider in the tubular guide way, the inner slider is so constructed as to be flexed along its longitudinal axis when an external force is applied thereto.

30 Claims, 5 Drawing Sheets

CONVEYER SYSTEM HAVING FLEXIBLE MAGNETIC INNER SLIDER FOR PROPELLING OUTER MEMBER

BACKGROUND OF THE INVENTION

1. Field of the Invention

The present invention relates in general to conveyer systems for moving articles to desired positions, and more particularly to conveyer systems of a type which comprises generally a guide way and a carrier unit driven along the guide way for carrying an article.

2. Description of the Prior Art

Hitherto, various conveyer systems of the above-mentioned type have been proposed and put into practical use particularly in the field of manufacture. One of them is of a type which, as is shown in Japanese Patent First Provisional Publication 48-73979 and Japanese Patent Second Provisional Publication 64-11534, comprises a guide way of tube, a magnet-mounted inner slider slidably disposed in the tubular guide way, a pressure source for feeding the tubular guide way with a pressurized air for moving the inner slider, a magnet-mounted outer slider slidably disposed on the outer side of the guide way and magnetically connected to the inner slider, and an article holder secured to the outer slider.

When the inner slider is moved in and along the guide way by the pressurized air fed into the guide way, the outer slider follows the inner slider while running on the guide way.

However, due to their inherent constructions, some of the conventional conveyer systems of the above-mentioned type have failed to exhibit a satisfied performance in case of conveying articles along a curved path. That is, in such a case, a curved tube is used as a part of the guide way. Usage of such a curved tube tends to bring about a certain difficulty in obtaining a smoothed movement of the inner slider in the curved section of the guide way. Furthermore, at such curved section of the guide way, the magnetic connection between the inner and outer sliders becomes poor due to an inevitable change in positional relationship therebetween. In fact, when, with the article holder (viz., outer slider) carrying a heavier article, the magnetic connection becomes poor, it tends to occur that the outer slider is disengaged or released from the inner slider.

SUMMARY OF THE INVENTION

It is therefore an object of the present invention to provide a conveyer system of the above-mentioned type, which is free of the above-mentioned drawbacks.

According to a first aspect of the present invention, there is provided a conveyer system which comprises a tubular guide way including a curved guide way section; a magnet-mounted inner slider slidably disposed in the tubular guide way, the inner slider including means for permitting the entire structure of the inner slider to be flexed along a longitudinal axis thereof when an external force is applied thereto; means for moving the inner slider in and along the tubular guide way; and a magnet-mounted outer slider movably disposed on the tubular guide way, the magnet of the outer slider establishing a magnetic connection with the magnet of the inner slider so that movement of the inner slider induces movement of the outer slider in the same direction.

According to a second aspect of the present invention, there is provided a conveyer system which comprises a tubular guide way including a curved guide way section; a magnet-mounted inner slider slidably disposed in the tubular guide way; a pressure source connected to the tubular guide way to feed the interior of the same with a pressurized air thereby to move the inner slider in the tubular guide way in a fore-and-aft direction; and a magnet-mounted outer slider axially movably disposed on the tubular guide way, the magnet of the outer slider establishing a magnetic connection with the magnet of the inner slider so that movement of the inner slider induces movement of the outer slider in the same direction, wherein the inner slider comprises a shaft which is flexible; two annular head members disposed on axially opposed ends of the flexible shaft, each head member being sealingly and slidably disposed in the tubular guide way; a plurality of annular magnets pivotally disposed on the flexible shaft between the two annular head members; and a low friction plastic layer applied to an outer surface of each annular magnet.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a conveyer system of the present invention will be described in detail with reference to the accompanying drawings.

Figure 1:
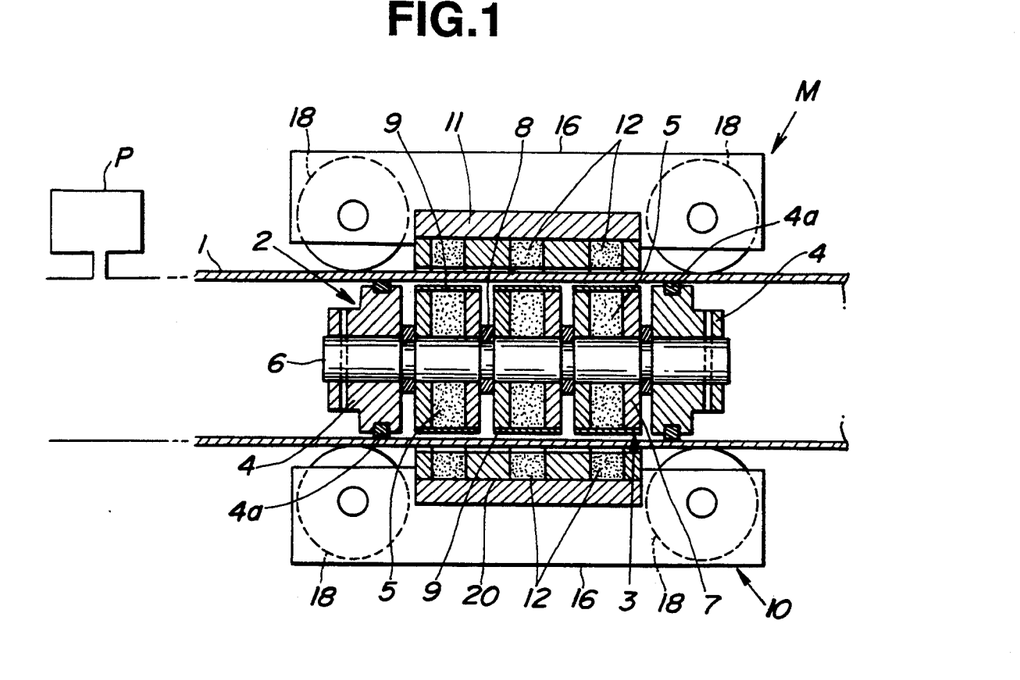
FIG. 1 is a vertically sectional view of a mover unit employed in a conveyer system of the present invention.

Referring to the drawings, particularly FIGS. 1, there is shown a mover unit "M" which moves forward or rearward along a tubular guide way 1.

Figure 3:
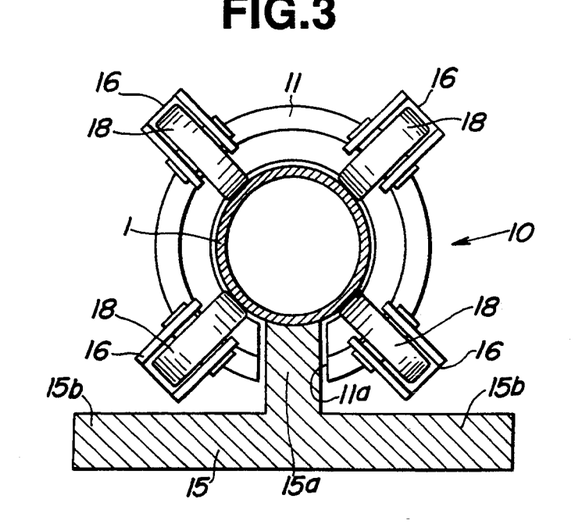
FIG. 3 is a sectional view of a magnet-mounted outer slider which is a part of the mover unit.

The tubular guide way 1 is constructed of non-magnetic material, such as, stainless steel, steel, aluminium, NYLON (trade name), TEFLON or the like. As is shown in FIG. 3, the tubular guide way 1 is supported on a rail 15 which extends along a given path which may be in the air.

As will become apparent as the description proceeds, for tightly connecting the guide way 1 to the rail 15, a plurality of connecting bolts are used which extend from the tubular guide way 1. That is, each connecting bolt from the guide way 1 passes through an opening formed in the rail 15 and is tightened by a nut.

Figure 2:
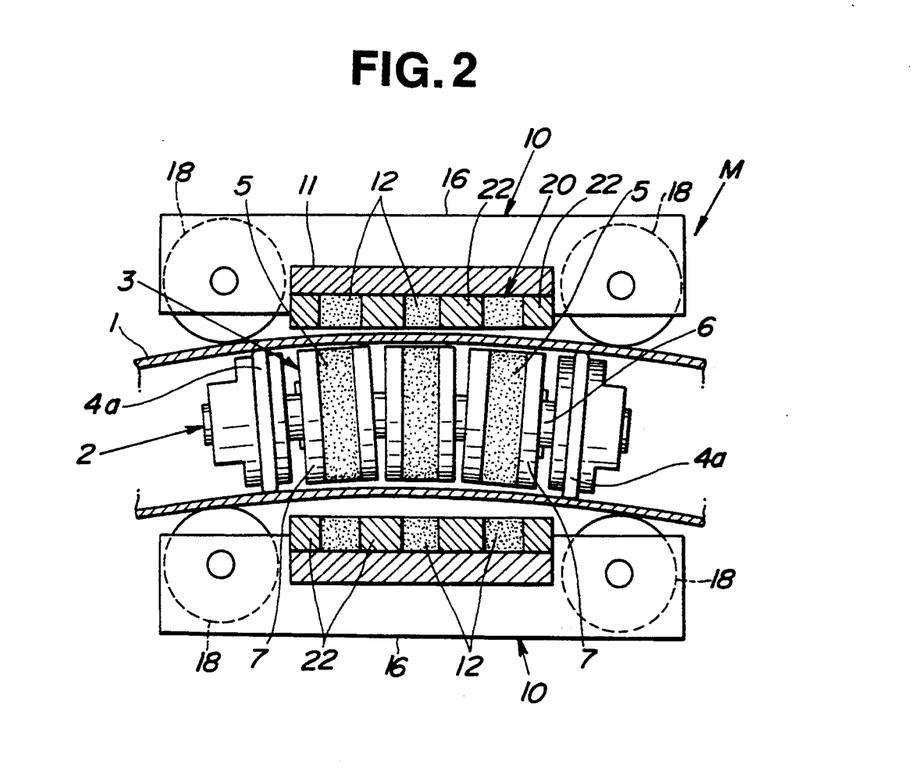
FIG. 2 is a view similar to FIG. 1, but showing a condition wherein the mover unit is at a curved section of a tubular guide way.

As is understood from FIGS. 1 and 2, the tubular guide way 1 comprises straight sections and curved sections which are jointed to constitute a winding guide way. If desired, these sections may constitute an endless circular guide way.

A pressure source "P" (see FIG. 1) is connected to the guide way 1 to feed the interior of the same with a pressurized air for driving or moving the mover unit "M" along the guide way 1.

The mover unit "M" comprises an inner slider 2 which is slidably disposed in the tubular guide way 1. Due to the pressurized air fed to the interior of the guide way 1, the inner slider 2 is moved forward or rearward in the guide way 1.

The inner slider 2 comprises two annular head members 4 and an inner magnet unit 3 interposed between the two head members 4. Each head member 4 is slidably engaged with a cylindrical inner wall of the guide way 1 through a seal ring 4a.

The inner magnet unit 3 comprises a plurality of (three in the illustrated embodiment) annular magnets 5 which are pivotally disposed on a common flexible shaft 6 which has axially opposed ends tightly held by the two annular head members 4, as shown. For the connection between the flexible shaft 6 and each head member 4, a known retainer pin is used. The flexible shaft 6 is constructed of rubber material, plastic material or the like. The magnets 5 are so arranged that the directions of line of magnetic force of them change alternately along the axis of the shaft 6.

As shown, each annular magnet 5 is sandwiched by two annular steel plates 7. An annular spacer 8 is disposed between two adjacent magnets 5 or between each head member 4 and one adjacent magnet 5. The spacer 8 is constructed of a shock absorbing material, such as soft rubber, soft plastic or the like. Thus, when the shaft 6 is flexed by a certain degree, the magnets 5 can easily change their postures on the shaft 6 within the tubular guide way 1. Each unit consisting of the magnet 5 and associated steel plates 7 has an outer surface applied with a lower friction plastic layer 9 such as fluororesin film or the like. With this plastic layer 9, the movement of the inner slider 2 in the tubular guide way 1 is smoothed. If desired, also the inner surface of the tubular guide way 1 is applied with a lower friction plastic layer for much assuring the smoothed movement of the inner slider 2.

The mover unit "H" further comprises an outer slider 10 which is moved on the tubular guide way 1 by the inner slider 2 with an aid of a magnetic connection therebetween.

As is understood from FIGS. 1 and 3, the outer slider 10 comprises a cylindrical cover 11 which is concentrically disposed about the tubular guide way 1 with a certain clearance kept therebetween. As is best seen from FIG. 3, the cylindrical cover 11 has a longitudinally extending slat 11a through which a raised part 15a of the rail 15 passes.

The cylindrical cover 11 is equipped with four roller units which are arranged about the tubular guide way 1 at evenly spaced intervals. Each roller unit comprises a rectangular roller holder 16 which is secured at a middle portion to the cylindrical cover 11 and two rollers 18 which are rotatably connected to longitudinally opposed ends of the holder 16 respectively. As is seen from FIG. 3, the rollers 18 held by the four holders 16 are put on the cylindrical outer surface of the tubular guide way 1, so that the outer slider 10 can run on the guide way 1 in fore-and-aft directions.

Figure 4:
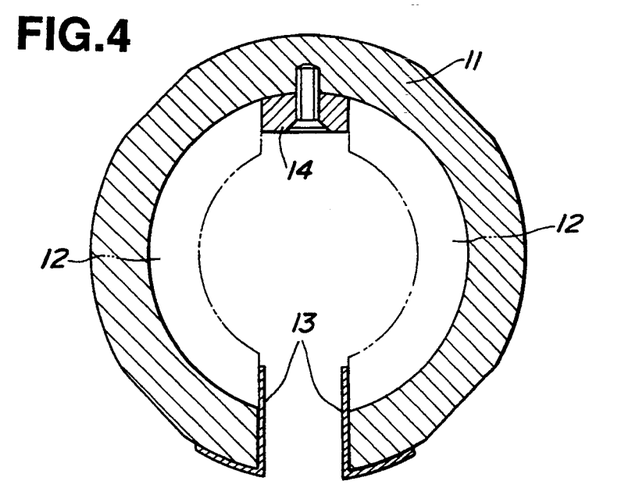
FIG. 4 is a sectional view of a cylindrical magnet cover which is a part of the outer slider.

As is seen from FIGS. 1 and 4, an outer magnet unit 20 is held by the cylindrical cover 11, which is associated with the inner magnet unit 3 of the inner slider 2 in a manner to establish a magnetic connection therebetween. Thus, when the inner slider 2 moves forward or rearward in the tubular guide way 1, the outer slider 10 follows the inner slider 2 while running on the tubular guide way 1.

Figure 5:
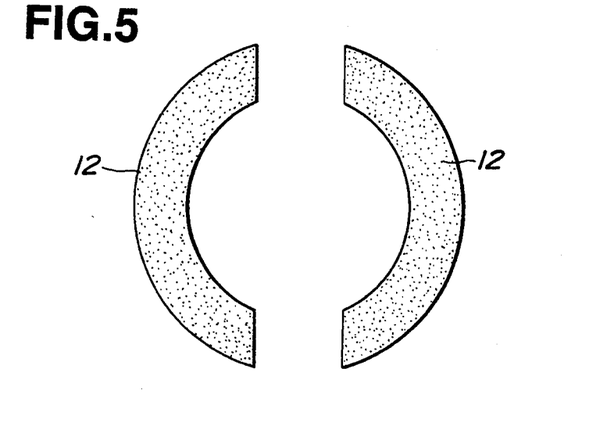
FIG. 5 is a front view of a pair of semicircular magnets which are a part of the outer slider.

The outer magnet unit 20 comprises three pairs of semicircular magnets 12 which are unmovably held in the cylindrical cover 11. Each pair of magnets 12 are sandwiched by a pair of semicircular steel plates 22.

As is shown in FIG. 4, in order to tightly retain the semicircular magnets 12 in the cylindrical cover 11, a retainer structure is employed which comprises two channel members 13 secured to opposed walls of the slot 11a of the cover 11 and an elongate spacer 14 secured to a ceiling of the interior of the cylindrical cover 11. That is, the semicircular magnets 12 and associated semicircular steel plates 22 are tightly put between the elongate spacer 14 and each channel member 13.

In order to achieve a smoothed movement of the outer slider 10 on the tubular guide way 1, the cylindrical inner surface of the outer magnet unit 11 may be applied with a low friction plastic layer, such as fluororesin layer or the like. Furthermore, if desired, the outer surface of the guide way 1 may be applied with such plastic layer.

Figure 6:
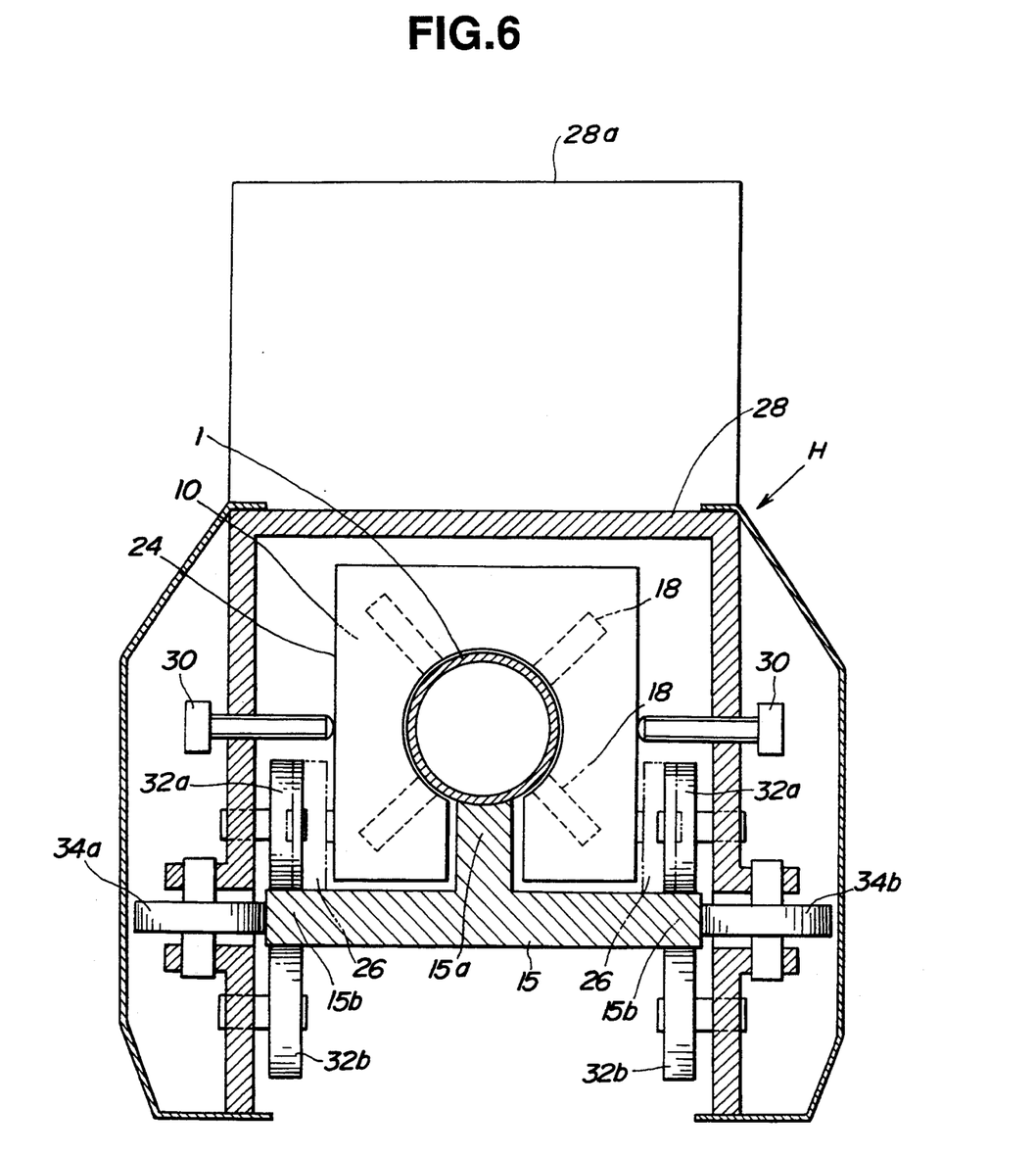
FIG. 6 is a sectional view of an article holder associated with the outer slider.

As is seen from FIG. 6, the outer slider 10 is housed in a rectangular case 24 which has wheels 26 running on flange portions 15b of the rail 15.

When, in operation, the interior of the tubular guide way 1 is fed with a pressurized air from the pressure source "P", the inner slider 2 is moved forward or rearward in the tubular guide way 1. Due to the magnetic connection established between the inner slider 2 and the outer slider 10, the latter follows the former together with the case 24 running on the tubular guide way 1. That is, upon feeding of the pressurized air into the guide way 1, the mover unit "M" moves forward or rearward along the guide way 1.

When, as is seen from FIG. 2, the mover unit "M" comes to a curved section of the tubular guide way 1, the inner slider 2 is permitted to flex in compliance with the shape of the curved section of the guide way 1. Thus, smoothed movement of the inner slider 2 is achieved even in such a curved guide way section. Furthermore, as is understood from FIG. 2, even when the inner slider 2 becomes flexed at such a curved guide way section, the magnetic connection between each annular magnet 5 of the inner slider 2 and the corresponding paired semicircular magnets 12 of the outer slider 10 is kept balanced. Thus, undesired releasement of the outer slider 10 from the inner slider 2, due to lack of magnetic force provided therebetween, is suppressed according to the present invention.

Referring to FIG. 6, there is shown an article holder "H" which is detachably connected to the case 24 of the outer slider 10.

The article holder "H" comprises a rectangular frame structure 28 which is arranged to cover the case 24 of the outer slider 10. The frame structure 28 has a container part 28a mounted thereon. Bolts 30 are used for detachably connecting the frame structure 28 to the case 24. The frame structure 28 has a plurality of paired vertical rollers 32a and 32b, each pair putting therebetween the flange portions 15b of the rail 15 in a vertical direction. The frame structure 28 has further a plurality of paired horizontal rollers 34a and 34b, each pair putting therebetween the rail 15 in a horizontal direction. Thus, the outer slider 10, the case 24 and the article holder "H" can move along the guide way 1 like a single unit in response to movement of the inner slider 2.

Figure 7:
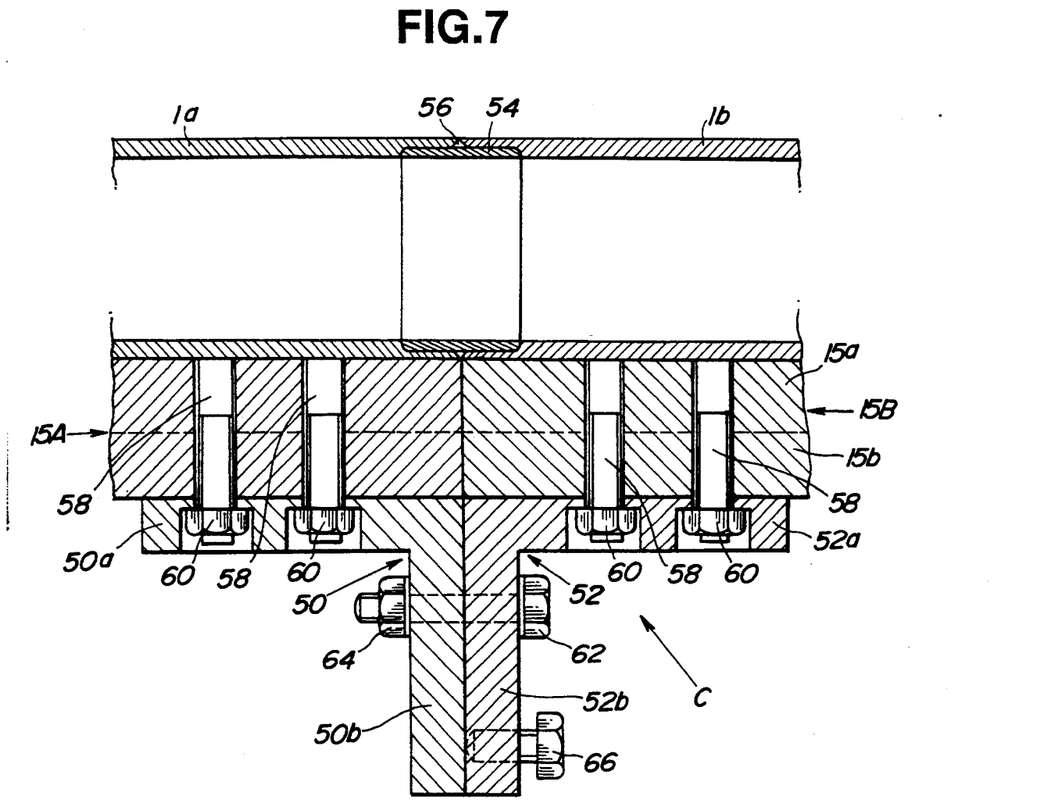
FIG. 7 is a sectional view of a tubular guide way a position where two tubular guide-way parts are jointed by a connector unit.
Figure 8:
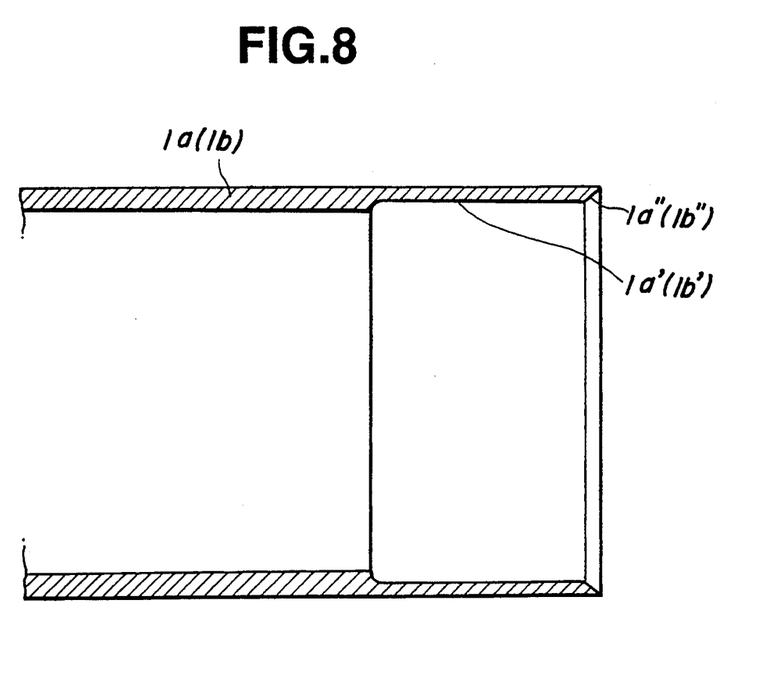
FIG. 8 is an enlarged sectional view of one end of each tubular guide-way part.

Referring to FIGS. 7 to 10, particularly FIG. 7, there is shown a connector unit "C" used for jointing two tubular guide-way parts 1a and 1b. The two tubular guide-way parts 1a and 1b which are to be jointed are mounted on respective rail parts 15A and 15B. Connecting bolts 58 are welded at one ends to each guide-way part 1a or 1b and extend through respective openings (no numerals) formed in the rail part 15A or 15B. Nuts 60 are engaged with the connecting bolts 58 to achieve a tight connection between the guide-way part 1a or 1b and the rail part 15A or 15B.

Figure 9:
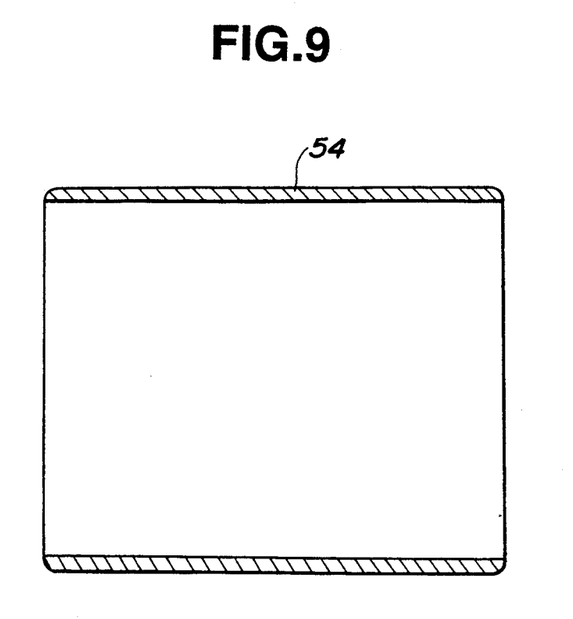
FIG. 9 is an enlarged sectional view of a cylindrical coupler used for jointing the two tubular guide-way parts.
Figure 10:
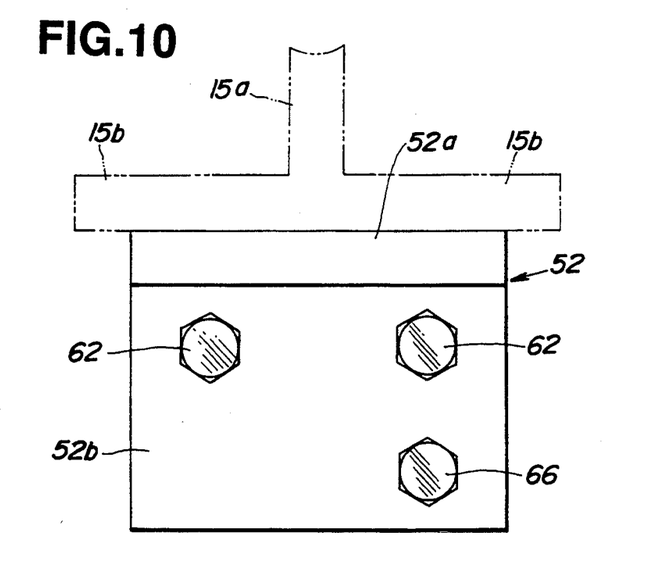
FIG. 10 is a front view of the connector unit.

The connector unit "C" comprises generally a pair of brackets 50 and 52, a cylindrical coupler 54 and an O-ring 56. As is seen from FIGS. 7 and 10, each bracket 50 or 52 comprises a vertical portion 50a or 52a and a horizontal portion 50b or 52b which are united to have a generally L-shaped cross section. The horizontal portion 50a or 52a is formed with stepped openings through which the connecting bolts 58 from the guide-way part 1a or 1b are to be passed. The vertical portion 50b or 52b of each bracket 50 or 52 is formed with two bolt openings. The vertical portion 52b of one bracket 52 has another bolt opening which is threaded. The cylindrical coupler 54 is shown in FIG. 9.

The following steps are taken for jointing the two tubular guide-way parts 1a and 1b. First, as is seen from FIG. 8, each guide-way part 1a or 1b is machined so that the bore thereof has an enlarged end portion 1a' or 1b' and has a tapered terminal end 1a" or 1b". The O-ring 56 is put on the cylindrical coupler 54. Then, the two tubular guide-way parts 1a and 1b are mated along with the respective rail parts 15A and 15B having the cylindrical coupler 54 received in the enlarged end portions 1a' or 1b' of the bores of the guide-way parts 1a and 1b. Thus, when the mating between the two guide-way parts 1a and 1b is properly made, the O-ring 56 is tightly set in an annular groove which is defined by the respective tapered terminal ends 1a" or 1b". Then, the nuts 60 are unfastened from the corresponding connecting bolts 58, and the two brackets 50 and 52 are located beneath the respective rail parts 15A and 15B mating the vertical portions 50b and 52b in a back-to-back manner. The horizontal portions 50a and 52a of the two brackets 50 and 52 are attached to the respective flange portions 15b of the rail parts 15A and 15B in a such manner that the stepped bolt openings of the horizontal portions 50a and 52a thereof receive the connecting bolts 58. Upon this, the bolt openings of the vertical portions 50b and 52b of the two brackets 50 and 52 are mated. Then, the nuts 60 are applied to the connecting bolts 58 to combine the bracket 50 or 52, the rail part 15A or 15B and the guide-way part 1a or 1b. Then, two connecting bolts 62 are passed through the mated bolt openings of the vertical portions 50b and 52b of the brackets 50 and 52 and two nuts 64 are engaged with the bolts 62. Finally, a shorter bolt 66 is screwed into the threaded bolt opening of the vertical portion of the bracket 52. Thus, when the coupling of the two guide-way parts 1a and 1b is completed, the connector unit "C" assumes a condition as shown in FIG. 7.

It is to be noted that when, with the connecting bolts 62 loosened, the shorter bolt 66 is turned in one or the other direction, the positional relationship between the two brackets 50 and 52 is changed, which induces a positional adjustment of the two guide-way parts 1a and 1b.

What is claimed is:

1. A conveyer system comprising:
   a tubular guide-way including a curved guide-way section;
   a magnet-mounted inner slider slidably disposed in said tubular guide way, said inner slider including means for permitting the entire structure of the inner slider to be flexed along a longitudinal axis thereof when n internal force is applied thereto;
   a pressure source connected to said tubular guide-way to feed the interior of said guide-way with a pressurized air thereby to move said inner slider in and along said tubular guide-way;
   a magnet-mounted outer slider movably disposed on said tubular guide-way, the magnet of said outer slider establishing a magnetic connection with the magnet of said inner slider so that movement of said inner slider induces movement of said outer slider in the same direction, in which said magnet-mounted inner slider comprises;
   a flexible shaft;
   two annular head members disposed on opposed ends of said flexible shaft;
   an inner magnet unit disposed on said flexible shaft between said annular head members; and
   in which said inner magnet unit comprises a plurality of annular magnets which are pivotally disposed on said flexible shaft.

2. A conveyer system as claimed in claim 1, in which said annular magnets are so arranged that the directions of line of magnetic force thereof change alternately along the axis of the flexible shaft.

3. A conveyer system as claimed in claim 2, in which said magnet unit further comprises:
   two annular steel plates by which each of said annular magnets is sandwiched; and
   a plurality of spacers each being interposed between adjacent two of said annular magnets or between each head member and one adjacent magnet; and
   a lower friction plastic layer which is lined on an outer cylindrical surface of each unit which consists of the annular magnet and the corresponding two annular steel plates.

4. A conveyer system as claimed in claim 1, in which said magnet-mounted outer slider comprises:
   a cylindrical cover concentrically disposed about said tubular guide way with a given annular clearance kept therebetween;
   a plurality of roller units held by said cylindrical cover, each roller unit being arranged to run on the cylindrical outer surface of said tubular guide way in fore-and-aft directions; and
   an outer magnet unit held by said cylindrical cover, said outer magnet unit establishing a magnetic connection with the inner magnet unit of said inner slider.

5. A conveyer system as claimed in claim 4, in which said roller units are arranged about the tubular guide way at evenly spaced intervals.

6. A conveyer system as claimed in claim 5, in which each of said roller units comprises:

a rectangular roller holder secured at its middle portion to said cylindrical cover; and two rollers rotatably connected to longitudinally opposed ends of said rectangular roller holders, each roller being put on the cylindrical outer surface of said tubular guide way.

7. A conveyer system as claimed in claim 6, in which said outer magnet unit comprises:

a plurality of paired semicircular magnets held by said cylindrical cover; and means for tightly connecting said paired semicircular magnets to said cylindrical cover.

8. A conveyer system as claimed in claim 4, in which said outer magnet unit has a cylindrical inner surface applied with a low friction plastic layer.

9. A conveyer system as claimed in claim 1, further comprises an article holder which is detachably connected to said outer slider for conveying articles to a desired position of said tubular guide way.

10. A conveyer system as claimed in claim 1, in which said flexible shaft of said inner slider is constructed of a rubber material or a plastic material.

11. A conveyer system as claimed in claim 1, in which said tubular guide way comprises:

a first tubular guide-way part;

a second tubular guide-way part; and a connector unit for coupling said first and second tubular guide-way parts.

12. A conveyer system as claimed in claim 11, in which said connector unit comprises:

a cylindrical coupler which has axially opposed end portions sealingly disposed in respective mouth portions of said first and second tubular guide-way parts;

first and second groups of connecting bolts which are possessed by said first and second tubular guide-way parts;

first and second brackets secured to said first and second groups of connecting bolts with an aid of respective nuts, said first and second bracket being arranged in a back-to-back manner; and means for securing said first and second brackets.

13. A conveyer system as claimed in claim 12, further comprises position adjusting means for adjusting the positional relationship between said first and second brackets.

14. A conveyer system as claimed in claim 13, in which said adjusting means comprises:

a threaded bolt; and means for defining in one of said first and second brackets a threaded bore, said threaded bore being operatively engaged with said threaded bore so that upon turning of said threaded bolt in said threaded bore, the positional relationship between said first and second brackets are forced to change.

15. A conveyer system comprising:

a tubular guide way including a curved guide way section;

a magnet-mounted inner slider slidably disposed in said tubular guide way;

a pressure source connected to said tubular guide way to feed the interior of the same with a pressurized air thereby to move said inner slider in said tubular guide way in a fore-and-aft direction; and a magnet-mounted outer slider axially movably disposed on said tubular guide way, the magnet of the outer slider establishing a magnetic connection with the magnet of said inner slider so that movement of said inner slider induces movement of said outer slider in the same direction, wherein said inner slider comprises:

a shaft which is flexible;

two annular head members disposed on axially opposed ends of the flexible shaft, each head member being sealingly and slidably disposed in said tubular guide way;

a plurality of annular magnets pivotally disposed on said flexible shaft between said two annular head members; and a low friction plastic layer applied to an outer surface of each annular magnet.

16. A conveyer system comprising:

a tubular guide-way including a curved guide-way section;

a magnet-mounted inner slider slidably disposed in said tubular guide-way, said inner slider including means of permitting the entire structure of the inner slider to be flexed along a longitudinal axis thereof when an external force is applied thereto, said magnet-mounted inner slider including a flexible shaft, two annular head members disposed on opposed ends of said flexible shaft, and an inner magnet unit disposed on said flexible shaft between said annular head members, said inner magnet unit including annular magnets which are pivotally disposed on said flexible shaft;

means for moving said inner slider in and along said tubular guide-way; and a magnet-mounted outer slider movably disposed on said tubular guide-way, the magnet of said outer slider establishing a magnetic connection with the magnet of said inner slider so that movement of said inner slider induces movement of said outer slider in the same direction.

17. A conveyer system as claimed in claim 16, in which said annular magnets are so arranged that the directions of line of magnetic force thereof change alternately along the axis of the flexible shaft.

18. A conveyer system as claimed in claim 17, in which said magnet unit further comprises:

two annular steel plates by which each of said annular magnets is sandwiched; and a plurality of spacers each being interposed between adjacent two of said annular magnets or between each head member and one adjacent magnet; and a lower friction plastic layer which is lined on an outer cylindrical surface of each unit which consists of the annular magnet and the corresponding two annular steel plates.

19. A conveyer system as claimed in claim 16 in which said magnet-mounted outer slider comprises:

a cylindrical cover concentrically disposed about said tubular guide-way with a given annular clearance kept therebetween;

a plurality of roller units held by said cylindrical cover, each roller unit being arranged to run on the cylindrical outer surface of said tubular guide-way in fore-and-aft directions; and an outer magnet unit held by said cylindrical cover, said outer magnet unit establishing a magnetic connection with the inner magnet unit of said inner slider.

20. A conveyer system as claimed in claim 19, in which said roller units are arranged about the tubular guide-way at evenly spaced intervals.

21. A conveyer system as claimed in claim 20, in which each of said roller units comprises:
 a rectangular roller holder secured at its middle portion to said cylindrical cover; and
 two rollers rotatably connected to longitudinally opposed ends of said rectangular roller holders, each roller being put on the cylindrical outer surface of said tubular guide-way.

22. A conveyer system as claimed in claim 21, in which said outer magnet unit comprises:
 a plurality of paired semicircular magnets held by said cylindrical cover; and
 means for tightly connecting said paired semicircular magnets to said cylindrical cover.

23. A conveyer system as claimed in claim 16, in which said flexible shaft of said inner slider is constructed of a rubber material or a plastic material.

24. A conveyer system as claimed in claim 16, in which said tubular guide-way comprises:
 a first tubular guide-way part;
 a second tubular guide-way part; and
 a connector unit for coupling said first and second tubular guide-way parts.

25. A conveyer system comprising:
 a tubular guide-way including a curved guide-way section;
 a magnet-mounted inner slider slidably disposed in said tubular guide-way, said inner slider including means for permitting the entire structure of the inner slider to be flexed along a longitudinal axis thereof when an external force is applied thereto;
 means for moving said inner slider in and along said tubular guide-way; and
 a magnet-mounted outer slider movably disposed on said tubular guide-way, the magnet of said outer slider establishing a magnetic connection with the magnet of said inner slider so that movement of said inner slider induces movement of said outer slider in the same direction, said magnet-mounted outer slider including:
 a cylindrical cover concentrically disposed about said tubular guide-way with a given annular clearance kept therebetween;
 a plurality of roller units held by said cylindrical cover, each roller unit being arranged to turn on the cylindrical outer surface of said tubular guide-way in fore-and-aft directions; and
 an outer magnet unit held by said cylindrical cover, said outer magnet unit establishing a magnetic connection with the inner magnet unit of said inner slider, said outer magnet unit having a cylindrical inner surface applied with a low friction plastic layer.

26. A conveyer system as claimed in claim 25, further comprises an article holder which is detachably connected to said outer Slider for conveying articles to a desired position of said tubular guide-way.

27. A conveyer system as claimed in claim 25, in which said means for moving said inner slider is a pressure source which is connected to said tubular guide-way to feed the interior of the same with a pressurized air.

28. A conveyer system comprising:
 a tubular guide-way including a curved guide-way section;
 a magnet-mounted inner slider slidably disposed in said tubular guide-way, said inner slider including means for permitting the entire structure of the inner slider to be flexed along a longitudinal axis thereof when an external force is applied thereto;
 means for moving said inner slider in and along said tubular guide-way; and
 a magnet-mounted outer slider movably disposed on said tubular guide-way, the magnet of said outer slider establishing a magnetic connection with the magnet of said inner slider so that movement of said inner slider induces movement of said outer slider in the same direction,
 wherein said tubular guide-way comprises:
 a first tubular guide-way part;
 a second tubular guide-way part; and
 a connector unit for coupling said first and second tubular guide-way parts, said connector unit including:
 a cylindrical coupler which has axially opposed end portions sealingly disposed in respective mouth portions of said first and second tubular guide-way parts;
 first and second groups of connecting bolts which are possessed by said first and second tubular guide-way parts;
 first and second brackets secured to said first and second groups of connecting bolts with an aid of respective nuts, said first and second brackets being arranged in a back-to-back manner; and
 means for securing said first and second brackets.

29. A conveyer system as claimed in claim 28, further comprises position adjusting means for adjusting the positional relationship between said first and second brackets.

30. A conveyer system as claimed in claim 29, in which said adjusting means comprises:
 a threaded bolt; and
 means for defining in one of said first and second brackets a threaded bore, said threaded bore being operatively engaged with said threaded bore so that upon turning of said threaded bolt in said threaded bore, the positional relationship between said first and second brackets are forced to change.

* * * * *